United States Patent [19]
Bolt

[11] Patent Number: 5,146,875
[45] Date of Patent: Sep. 15, 1992

[54] MEDICATED THERAPY APPARATUS FOR PETS

[76] Inventor: Paul D. Bolt, 2918 Albee St., Eureka, Calif. 95501

[21] Appl. No.: 772,319

[22] Filed: Oct. 7, 1991

[51] Int. Cl.⁵ ............................................. A01K 27/00
[52] U.S. Cl. ........................................ 119/96; 119/156
[58] Field of Search ................... 119/156, 106, 109, 96

[56] References Cited

U.S. PATENT DOCUMENTS

| | | | |
|---|---|---|---|
| D. 297,776 | 9/1988 | Bridges | D30/152 |
| 1,614,083 | 1/1927 | Plantico | 119/106 |
| 2,219,569 | 10/1940 | Vanderloof | 119/156 |
| 3,811,413 | 5/1974 | Scherpenborg | 119/156 |
| 3,994,264 | 11/1976 | Flynt | 119/106 |
| 4,184,452 | 1/1980 | Buzzell | 119/156 |
| 4,224,901 | 10/1980 | Carey, Jr. | 119/106 |
| 4,355,599 | 10/1982 | Fickes et al. | 119/96 |
| 4,553,633 | 11/1985 | Armstrong | 119/96 |
| 4,655,172 | 4/1987 | King | 119/96 |
| 5,003,756 | 4/1991 | Mazzotta | 119/156 |

FOREIGN PATENT DOCUMENTS

| | | | |
|---|---|---|---|
| 24675 | 1/1930 | Australia | 119/96 |
| 2645402 | 10/1990 | France | 119/156 |
| 613033 | 11/1948 | United Kingdom | 119/96 |

*Primary Examiner*—John G. Weiss
*Attorney, Agent, or Firm*—Henderson & Sturm

[57] ABSTRACT

A medicated therapy apparatus (10) for animals (100) wherein the apparatus (10) includes a harness unit (11) a collar unit (12) and a leash unit (13); wherein, at least the harness unit (11) comprises a plurality of strap members connected to one another; and, wherein at least some of the strap members include an outer layer (50) an apertured inner laayer (51) and an intermediate medicated insert (53) which dispenses medicant from the medicated insert (53) through the apertures (54) in the inner layer (51) to the animal (100).

7 Claims, 3 Drawing Sheets

MEDICATED THERAPY APPARATUS FOR PETS

TECHNICAL FIELD

The present invention relates to the field of harness and collar arrangements for animals in general, and in particular to a combined collar and harness arrangement that covers widely spaced portions of an animals body such that the entire animals body will be subjected to the beneficial effects of a medically impregnated strip that is incorporated into the collar and harness arrangement.

BACKGROUND ART

As can be seen by reference to the following U.S. Pat. Nos. 3,994,264; 4,355,599, 4,224,901; and DES297,776; the prior art is replete with myriad and diverse harness devices as well as flea collar arrangements.

While all of the aforementioned prior art constructions are more than adequate for the basic purpose and function for which they have been specifically designed, these prior art arrangements can be broken down into two distinct classes of inventions such as medicated flea collars and non-medicated harness devices.

As any large animal pet owner is aware a medicated flea collar is simply not effective over the entire length of the animals body; wherein, the flanks and lower back of the animal receive very little or any benefit from the flea collar due to the remote location of these parts of the animals body relative to the flea collar.

As a consequence of the foregoing situation, there has existed a longstanding need among a significant number of pet owners for a new type of medicated therapy apparatus that will prove to be effective over virtually the entire length of the animal; and, the provision of such a construction is a stated objective of the present invention.

DISCLOSURE OF THE INVENTION

Briefly stated, the medicated therapy apparatus that forms the basis of the present invention comprises in general a medicated harness unit operatively associated with a medicated collar unit via a nonmedicated leash unit.

In addition both the medicated harness unit and the medicated collar unit each comprise strap members having absorbent strip elements disposed on the undersides of the strap members wherein the absorbent strip members are intended to be impregnated with any one of a number of medical and or herbal treatments such as creams, ointments, powders, lotions or the like to treat a wide spectrum of animal maladies or skin conditions, such as fleas, mange eczema, etc.

As will be explained in greater detail further on in the specification, not only will the medicated therapy apparatus of the invention effectively treat virtually the entire body of an animal; but, the interconnecting leash unit between the medicated harness and collar units will provide enhanced handling and control of the animal due to the plural spaced anchor points, where the leash unit is connected to the harness unit and the collar unit.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
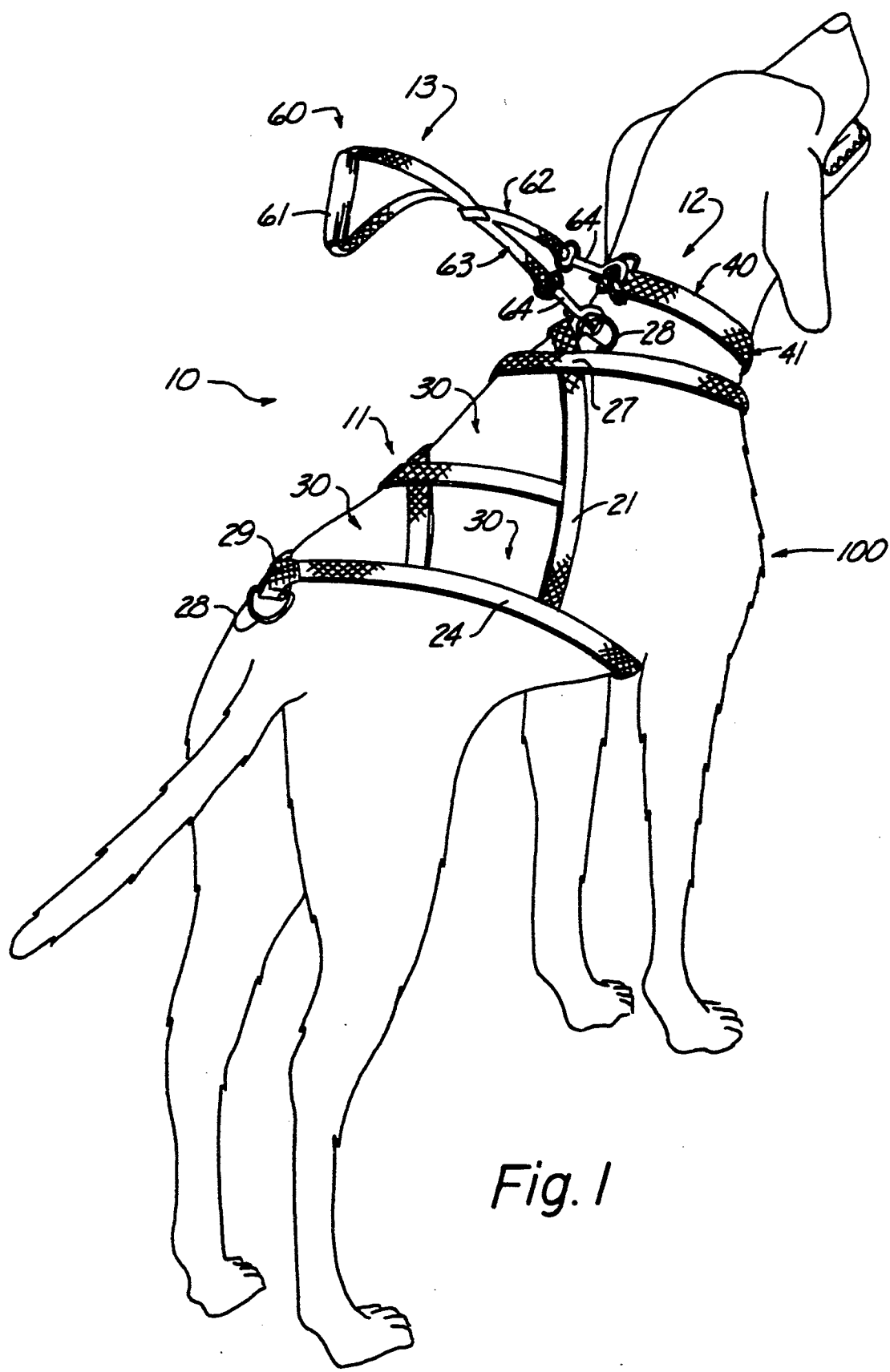
FIG. 1 is a perspective view of the medicated therapy apparatus.

As can be seen by reference to the drawings, and in particular to FIG. 1, the medicated therapy apparatus that forms the basis of the present invention is designated generally by the reference numeral (10). The apparatus (10) comprises in general a harness unit (11) a collar unit (12) and a leash unit (13). These units will now be described in seriatim fashion.

As can best be seen by reference to FIGS. 1 through 4, the harness unit (11) comprises a plurality of strap members which are arranged in an open network fashion including two elongated front strap members (20) (21) a pair of shorter cross piece strap members (22) and (23); and two elongated rear strap members (24) (25).

Still referring to FIGS. 1 through 4, it can be seen that the front portion of the front strap members (20) and (21) are operatively attached to the upper portion of an elongated chest pad (26); wherein, the intermediate portions of the front strap members (20) (21) are arranged in a cross pattern over the dogs front quarters and joined together by a first gusset element (27) equipped with a D-ring (28); and, wherein the rear portions of the front strap members (20) (21) are joined respectively to the intermediate portions of the rear strap members (25) and (24).

In addition, the front portions of the rear strap members (24) (25) are operatively connected to the lower portion of the chest pad element (26); wherein, the intermediate portions of the rear strap members (24) (25) traverse the dogs flanks and the rear portions are joined together proximate the dogs tail by a second gusset element (29) which is likewise provided with a D-ring (28).

Figure 3:
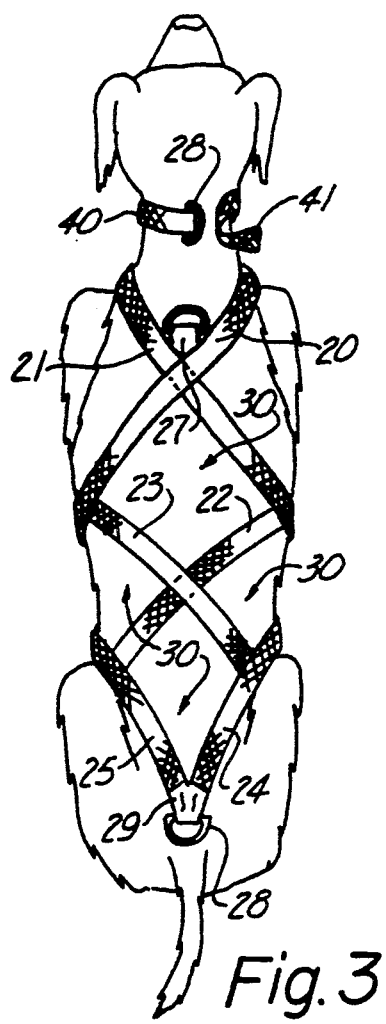
FIG. 3 is a top plan view of the harness unit and the collar unit.
Figure 4:
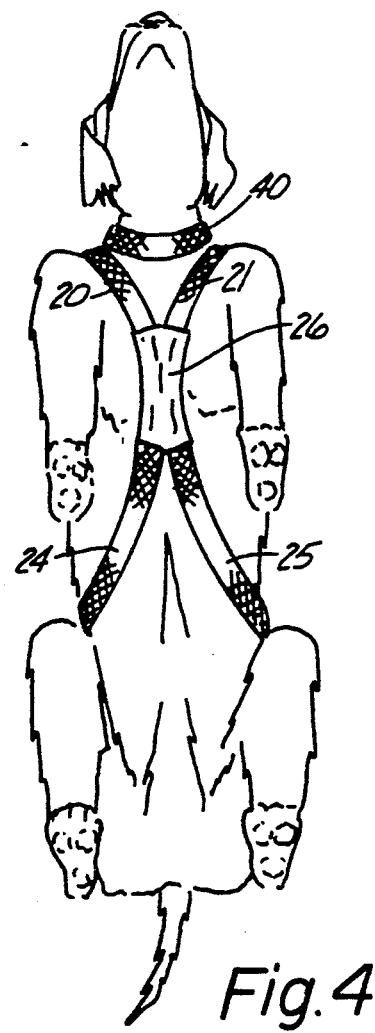
FIG. 4 is a bottom plan view of the harness unit and the collar unit.

Furthermore as shown in FIGS. 1 and 3, the cross-piece strap members (22) and (23) are arranged in an x-shaped pattern across the top of the dogs back; wherein, the opposite ends of the cross-piece strap members (22) and (23) are connected to the lower intermediate portions of both the front (20) (21) and the rear (24) (25) strap members to create a plurality of generally diamond shaped openings (30) in the strap unit (11).

It can be seen by reference to FIG. 1 that the collar unit (12) comprises a collar element (40) fabricated from a unique collar strap member (41) similar in construction to the strap members (20) (21) (22) (23) (24) and (25) that comprise the harness unit (11); wherein, the collar element (40) is further provided with yet another D-ring (28).

Figure 2:
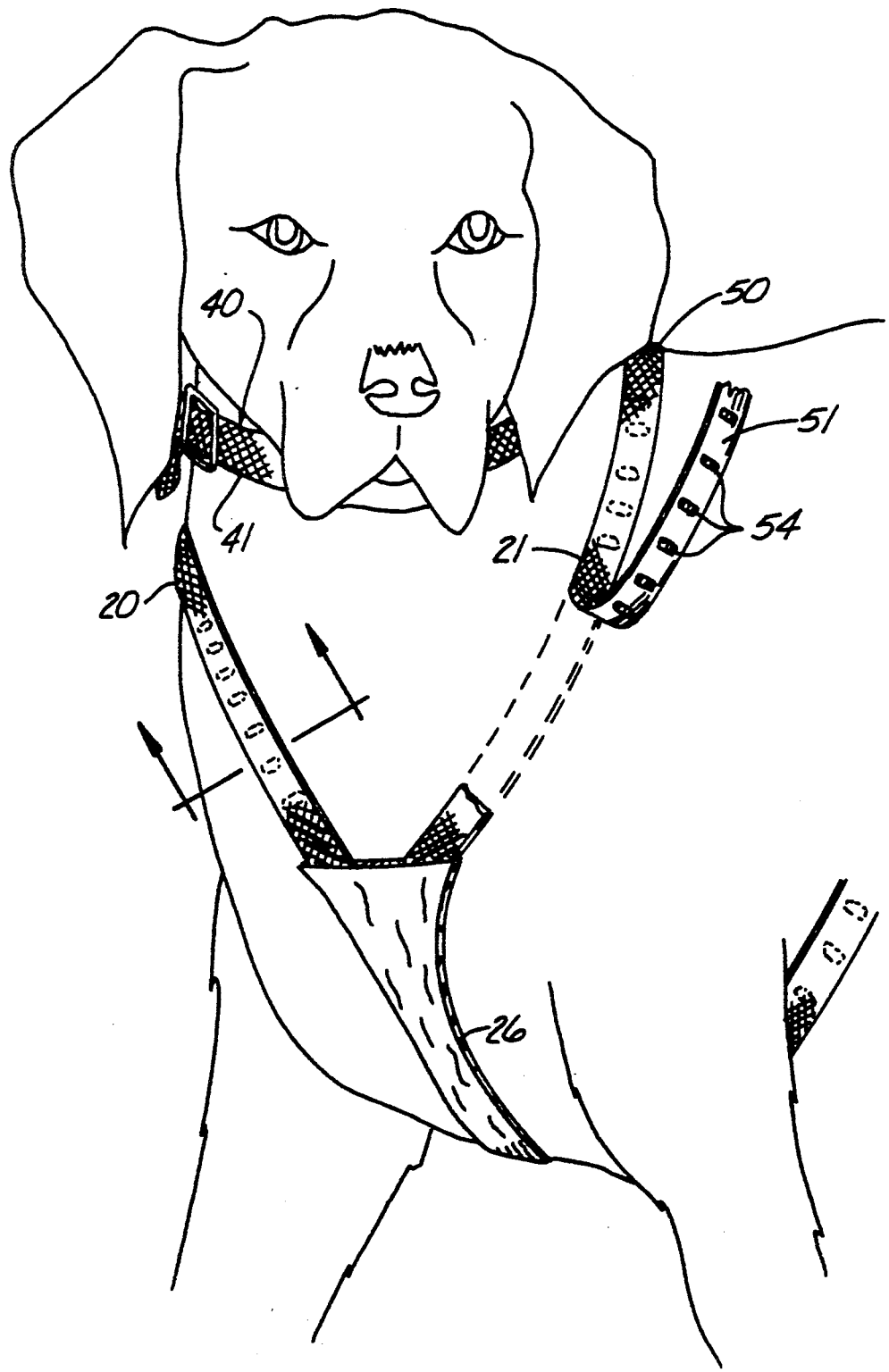
FIG. 2 is an enlarged front perspective view of the engagement of the harness unit with the animals chest.
Figure 5:
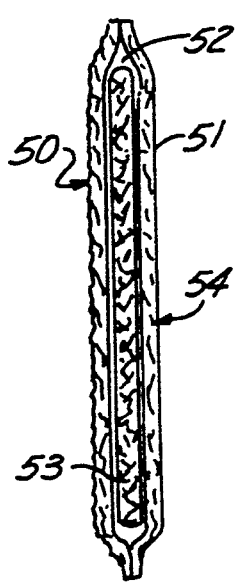
FIG. 5 is a typical cross-sectional view through the strap member and absorbent strip insert element; and, FIG. 6 is an enlarged detail view of the strap member and absorbent strip insert element.
Figure 6:
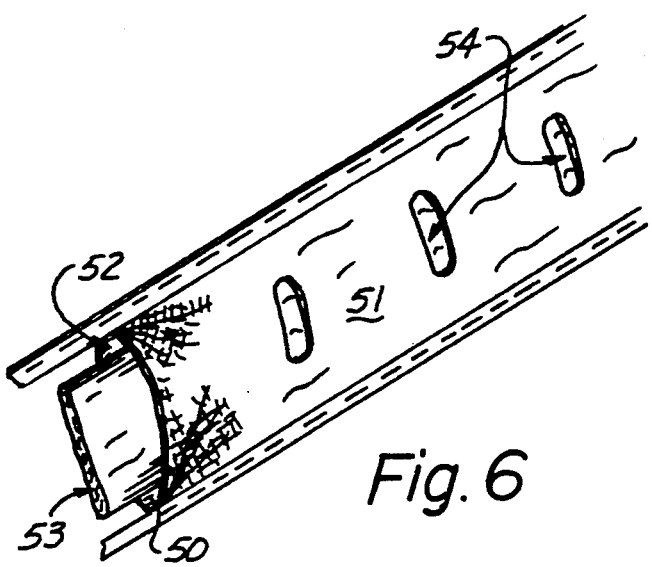

At this juncture it should be noted that since all of the strap members (40) (20) (21) etc. have the same basic construction only one of the strap members (21) will be described in detail. Turning now to FIGS. 2, 5 and 6, that all of the strap members comprise generally impervious outer layer (50) secured on its upper and lower ends to an apertured inner layer (51) to define an internal chamber (52) which is dimensioned to receive an absorbent medicated insert (53) whose purpose and function will be described presently.

As can best be seen by reference to FIGS. 5 and 6, the apertured inner layer (51) is provided with a plurality of spaced elongated apertures (54) along its entire length such that the absorbent medicated insert (53) will be capable of dispensing medication at spaced locations along the dogs body proximate the location of the apertures (54) relative to the dogs body.

As was mentioned previously the apparatus (10) was designed to provide therapeutic effects over substantial portions of the dogs anatomy; and, to that end the medicated insert (53) may not only be impregnated with a selected one among a variety of medicates; but, the insert (53) may also be replenished with the same or different medicants introduced through the plurality of apertures (54) along either the entire length or selected portions of the strap members (40) (20) (21) to apply medicant either to broad areas or specific locales on the dogs body.

Turning now to FIG. 1, it can be seen that the leash unit (13) comprises a leash member (60) having a handle loop (61) operatively connected to a pair of lead segments (62) (63); wherein, each lead segment (62) (63) is provided with a conventional snap swivel (64) adapted to releasably engage any of the D-rings on the apparatus (10).

In the orientation of the apparatus (10) depicted in FIG. 1 one of the lead segments (62) is operatively attached by the snap swivel (64) to the D-ring (28) on the collar element (40); while the other lead segment (63) is attached to the front end of the harness unit (11) by the snap swivel (64) in a well recognized manner.

In this particular orientation the leash unit (13) is operatively connected between the collar unit (12) and harness unit (11) to provide a neck and chest dual anchor control of the dog.

However in another orientation of the apparatus (10) (not shown) the leash unit (13) is intended to be operatively connected to the D-ring (28) on both ends of the harness unit (11) to assist in the lifting of the dog via the harness unit (11) onto an elevated platform, such as an examination table in a veterinarians office.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I Claim:

1. A medicated therapy apparatus for applying medicant over a large surface area on a dog; wherein, the apparatus comprises
    a harness unit comprising a plurality of strap member including: a pair of front strap member having front, intermediate and rear portion; wherein, the intermediate portions of said front strap members are operatively connected together by a first gusset element; a pair of rear strap members operatively connected to said front strap members, wherein the rear strap members have front, intermediate, and rear portions; wherein, the rear portions of the said rear strap members are connected together by a second gusset element; and, wherein each of said strap members are fabricated from an outer layer, an inner apertured layer and a medicated insert disposed between said outer and inner layers.

2. The apparatus as in claim 1; wherein, the harness unit further comprises:
    a chest pad having an upper portion and a lower portion; wherein the front portion of the front strap members are attached to the upper portion of the chest pad and the front portion of the rear strap members are connected tot he lower portion of the chest pad.

3. The apparatus as in claim 2; wherein, the harness unit further comprises:
    at least one cross-piece strap member operatively connected between a selected pair of said front and rear strap members.

4. The apparatus as in claim 2; wherein, the harness unit further comprises:
    a pair of cross-piece strap members connected between said front and rear strap member.

5. The apparatus as in claim 4; wherein each of said gusset elements is provided with a ring.

6. The apparatus as in claim 5; further comprising:
    a leash unit including a leash member having a handle loop operatively connected to a pair of lead segments equipped with snap swivels; wherein, the lead segments and snap swivels are dimensioned to extend between and be operatively connected to the rings on said gussets.

7. The apparatus as in claim 6; further comprising:
    a collar unit including a collar element having a collar strap member and a ring attached to said collar strap member; wherein, said collar strap member is operatively attached to said harness unit by said leash unit.

* * * * *